(12) United States Patent  
Deng et al.

(10) Patent No.: US 9,307,520 B2
(45) Date of Patent: Apr. 5, 2016

(54) METHOD, APPARATUS AND SYSTEM FOR CONFIGURING ENERGY-SAVING CELL

(71) Applicant: Huawei Technologies Co., Ltd., Shenzhen (CN)

(72) Inventors: Tianle Deng, Shanghai (CN); Binsong Tang, Shanghai (CN); Li Yang, Shanghai (CN); Hongzhuo Zhang, Shanghai (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 156 days.

(21) Appl. No.: 13/769,697

(22) Filed: Feb. 18, 2013

(65) Prior Publication Data

US 2013/0155936 A1 Jun. 20, 2013

Related U.S. Application Data

(63) Continuation of application No. PCT/CN2011/075298, filed on Jun. 3, 2011.

(30) Foreign Application Priority Data

Aug. 17, 2010 (CN) .......................... 2010 1 0255446

(51) Int. Cl.
*H04L 12/28* (2006.01)
*H04W 72/00* (2009.01)
*H04W 52/02* (2009.01)
*H04J 1/16* (2006.01)

(52) U.S. Cl.
CPC ........ *H04W 72/005* (2013.01); *H04W 52/0206* (2013.01); *Y02B 60/50* (2013.01)

(58) Field of Classification Search
USPC .......................... 370/252, 329, 336, 386, 430
See application file for complete search history.

(56) References Cited

U.S. PATENT DOCUMENTS

2008/0260062 A1* 10/2008 Imamura ....................... 375/267
2009/0252075 A1* 10/2009 Ji et al. ........................... 370/312

(Continued)

FOREIGN PATENT DOCUMENTS

CN 101682881 A 3/2010
WO WO 2009/041871 A1 4/2009

OTHER PUBLICATIONS

ETSI, TS 136 423 Technical Specification, LTE; Evolved Universal Terrestrial Radio Access Network (E-UTRAN); X2 Application Protocol (X2AP), Nov. 2008, ETSI, V8.3.0, §9.*

(Continued)

*Primary Examiner* — John Pezzlo
(74) *Attorney, Agent, or Firm* — Huawei Technologies Co., Ltd.

(57) ABSTRACT

A method for configuring a cell includes the following steps. A network node obtains information for configuring serviceless Multicast Broadcast Single Frequency Network (MBSFN) sub-frames of a first cell; and the network node configures serviceless MBSFN sub-frames of a neighboring cell of the first cell by alternating the serviceless MBSFN sub-frames of the neighboring cell with the serviceless MBSFN sub-frames of the first cell according to the information for configuring the serviceless MBSFN sub-frames of the first cell. In the method for configuring the first cell, the serviceless MBSFN sub-frames of the neighboring cell alternate with the serviceless MBSFN sub-frames of the first cell, thereby reducing interference between cells and improving stability of the system.

16 Claims, 6 Drawing Sheets

(56) References Cited

U.S. PATENT DOCUMENTS

| | | |
|---|---|---|
| 2010/0009945 A1 | 1/2010 | Deluca et al. |
| 2010/0062723 A1 | 3/2010 | Tao et al. |
| 2010/0118706 A1 | 5/2010 | Parkvall et al. |
| 2010/0151876 A1* | 6/2010 | Park et al. .................. 455/452.2 |
| 2010/0172311 A1 | 7/2010 | Agrawal et al. |
| 2010/0182903 A1 | 7/2010 | Palanki et al. |
| 2010/0195748 A1 | 8/2010 | Nam et al. |
| 2010/0239034 A1* | 9/2010 | Lee ....................... H04L 5/0053 375/260 |
| 2012/0113886 A1* | 5/2012 | Zhang et al. .................. 370/312 |
| 2012/0236790 A1 | 9/2012 | Saban et al. |

OTHER PUBLICATIONS

Extended European Search Report issued in corresponding European Patent Application No. 11786127.8, mailed Jun. 5, 2013, 6 pages.

Written Opinion of the International Searching Authority issued in corresponding PCT Patent Application No. PCT/CN2011/075298, mailed Sep. 15, 2011.

International Search Report issued in corresponding PCT Patent Application No. PCT/CN2011/075298, mailed Sep. 15, 2011.

Office Action issued in corresponding Chinese Patent Application No. 201010255446.0, mailed Jun. 27, 2013, 30 pages.

* cited by examiner

METHOD, APPARATUS AND SYSTEM FOR CONFIGURING ENERGY-SAVING CELL

CROSS REFERENCE TO RELATED APPLICATIONS

This application is a continuation of International Application No. PCT/CN2011/075298, filed on Jun. 3, 2011, which claims priority to Chinese Patent Application No. 201010255446.0, filed on Aug. 17, 2010, both of which are hereby incorporated by reference in their entireties.

TECHNICAL FIELD

The present application relates to the field of mobile communication technologies, and in particular, to a technology of configuring a cell.

BACKGROUND

In a Long Term Evolution (LTE) system or Long Term Evolution-Advanced (LTE-A) system, certain sub-frames of a radio frame may be configured as Multicast Broadcast Single Frequency Network (MBSFN) sub-frames. The MBSFN sub-frame may be an idle sub-frame, namely, a serviceless MBSFN sub-frame; the MBSFN sub-frame may also be a non-idle sub-frame, namely, an MBSFN sub-frame used for transmitting services.

Because Common Reference Signals (CRSs) of an MBSFN sub-frame are less than the CRSs of an ordinary sub-frame (such as a unicast sub-frame), the transmission time is reduced. Meanwhile, when no CRS needs to be sent, a Power Amplifier (PA) in the corresponding Packet Switched (PS) domain may be shut down to save power, thereby saving energy.

However, after MBSFN sub-frames are configured in the system, the service sub-frame resources are more centralized. Therefore, with the MBSFN sub-frames being used to save energy of the system, if all neighboring cells are using MBSFN sub-frames to save energy, the probability of generating interference at the edge of the cell increases, and the spectrum efficiency is reduced.

SUMMARY

In one aspect, the present application provides a method for configuring a cell, where the method includes: obtaining, by a network node, information for configuring a first set of serviceless Multicast Broadcast Single Frequency Network (MBSFN) sub-frame(s) of a first cell; and configuring, by the network node, a second set of serviceless MBSFN sub-frame(s) of a neighboring cell of the first cell by alternating or partly alternating the second set of serviceless MBSFN sub-frame(s) with the first set of serviceless MBSFN sub-frame(s) according to the information for configuring the first set of serviceless MBSFN sub-frame(s).

In another aspect, the present application provides a base station, including: a receiver, configured to receive information for configuring a first set of serviceless Multicast Broadcast Single Frequency Network (MBSFN) sub-frame(s) of a neighboring cell of a first cell belonging to the base station; a configuring unit, configured to configure a second set of serviceless MBSFN sub-frame(s) of the first cell by alternating or partly alternating the second set of serviceless MBSFN sub-frame(s) with the first set of serviceless MBSFN sub-frame(s) according to the information for configuring the first set of serviceless MBSFN sub-frame(s); and a first transmitter, configured to transmit the configured second set of serviceless MBSFN sub-frame(s).

In another aspect, the present application provides a centralized control device, including: a receiving unit, configured to receive information for configuring serviceless MBSFN sub-frames of an energy-saving cell from a base station; and a configuring unit, adapted to configure serviceless MBSFN sub-frames for a neighboring cell of the energy-saving cell by alternating the serviceless MBSFN sub-frames of the neighboring cell with the serviceless MBSFN sub-frames of the energy-saving cell according to the information for configuring the serviceless MBSFN sub-frames of the energy-saving cell.

In another aspect, the present application provides a system for configuring an energy-saving cell. The system includes the centralized control device and a base station of the energy-saving cell. The base station of the energy-saving cell is configured to send information for configuring serviceless MBSFN sub-frames of the energy-saving cell to the centralized control device.

In the foregoing technical solution, the serviceless MBSFN sub-frames of the neighboring cell alternate with the serviceless MBSFN sub-frames of the energy-saving cell, thereby reducing interference between cells and improving stability of the system.

DETAILED DESCRIPTION OF THE EMBODIMENTS

The following describes embodiments of the present application in detail with reference to accompanying drawings.

Figure 1:
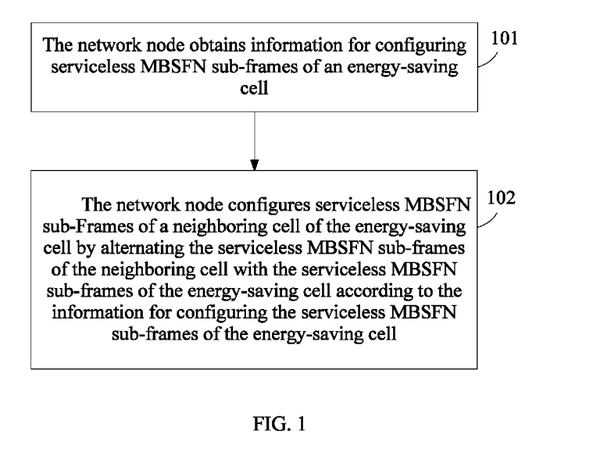
FIG. 1 is a flowchart of a method for configuring an energy-saving cell according to an embodiment of the present application.

As shown in FIG. 1, a method for configuring an energy-saving cell in an embodiment of the present application includes the following steps.

101: A network node obtains information for configuring serviceless MBSFN sub-frames of an energy-saving cell.

102: The network node configures serviceless MBSFN sub-frames of a neighboring cell of the energy-saving cell by alternating the serviceless MBSFN sub-frames of the neighboring cell with the serviceless MBSFN sub-frames of the energy-saving cell according to the information for configuring the serviceless MBSFN sub-frames of the energy-saving cell.

In an embodiment of the present application, the alternating the serviceless MB SFN sub-frames of the neighboring cell with the serviceless MBSFN sub-frames of the energy-saving cell includes the following configuration: The serviceless MBSFN sub-frames of the neighboring cell never overlap, or partly overlap, the serviceless MBSFN sub-frames of the energy-saving cell.

In another embodiment, the method may further include the following steps. A base station of the energy-saving cell sends Time division interference Overload Indicator (TOI) information to the network device after detecting that interference exceeds a preset threshold, or the base station of the energy-saving cell sends Time division High Interference Indication (THII) information to the network device if the energy-saving cell uses a high-interference sub-frame. After receiving the TOI information and/or THII information sent by the base station of the energy-saving cell, the network device configures the serviceless MBSFN sub-frames of the neighboring cell according to the received information for configuring the serviceless MBSFN sub-frames of the energy-saving cell.

Optionally, when the serviceless MBSFN sub-frames of the energy-saving cell change, the base station of the energy-saving cell sends a notification message to the network device, where the notification message is used for indicating the change of the serviceless MBSFN sub-frames of the energy-saving cell. The change of the serviceless MBSFN sub-frames of the energy-saving cell includes: increasing or decreasing the serviceless MBSFN sub-frames of the energy-saving cell; and the decreasing of the serviceless MBSFN sub-frames of the energy-saving cell includes: sending a Multicast Broadcast Media Service (MBMS) in the serviceless MBSFN sub-frames of the energy-saving cell, or configuring the serviceless MBSFN sub-frames of the energy-saving cell as unicast sub-frames or other service sub-frames.

In the method for configuring the energy-saving cell, the serviceless MBSFN sub-frames of the neighboring cell alternate with the serviceless MBSFN sub-frames of the energy-saving cell, thereby reducing interference between cells and improving stability of the system.

The network node in the foregoing embodiment includes a base station of the neighboring cell of the energy-saving cell or a centralized control device. When the network node is a base station of the neighboring cell of the energy-saving cell, the base station of the neighboring cell of the energy-saving cell obtains information for configuring the serviceless MBSFN sub-frames of the energy-saving cell, and configures the serviceless MBSFN sub-frames of the neighboring cell by alternating the serviceless MBSFN sub-frames of the neighboring cell with the serviceless MBSFN sub-frames of the energy-saving cell according to the information for configuring the serviceless MBSFN sub-frames of the energy-saving cell.

Figure 2:
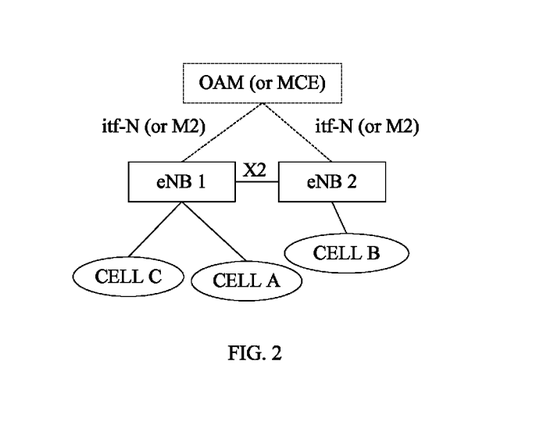
FIG. 2 is a schematic structure diagram of a system according to an embodiment of the present application.
Figure 4A:
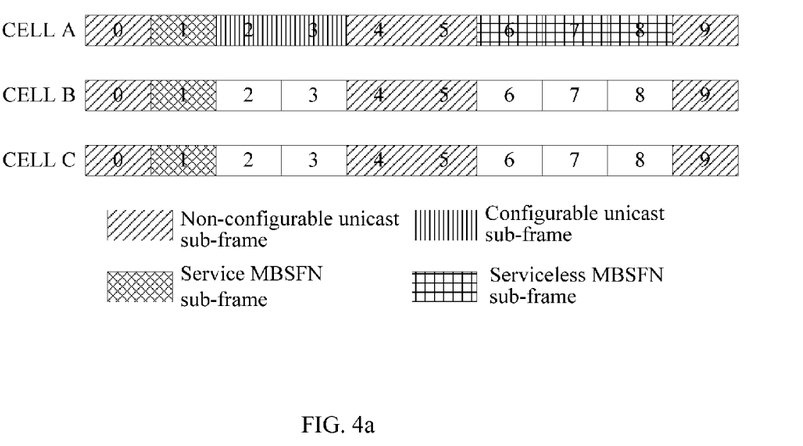
FIG. 4a-4c are schematic diagrams of configuring sub-frames in a cell according to an embodiment of the present application.

The following describes the method for configuring the energy-saving cell, supposing that cell A and cell C are under the same base station, for example, evolved NodeB (eNB)1, and cell B is under eNB2, as shown in FIG. 2. In this embodiment, cell A, cell B, and cell C are adjacent to one another; and cell A is an energy-saving cell for which serviceless MBSFN sub-frames are configured. As shown in FIG. 4*a*, in cell A, cell B, and cell C, sub-frame 0, sub-frame 4, sub-frame 5, and sub-frame 9 are non-configurable unicast sub-frames, and sub-frame 1 is a sub-frameservice MBSFN sub-frame. eNB1 configures sub-frame 6, sub-frame 7, and sub-frame 8 of cell A as serviceless MBSFN sub-frames, and configures sub-frame 2 and sub-frame 3 as configurable unicast sub-frames.

Figure 3:
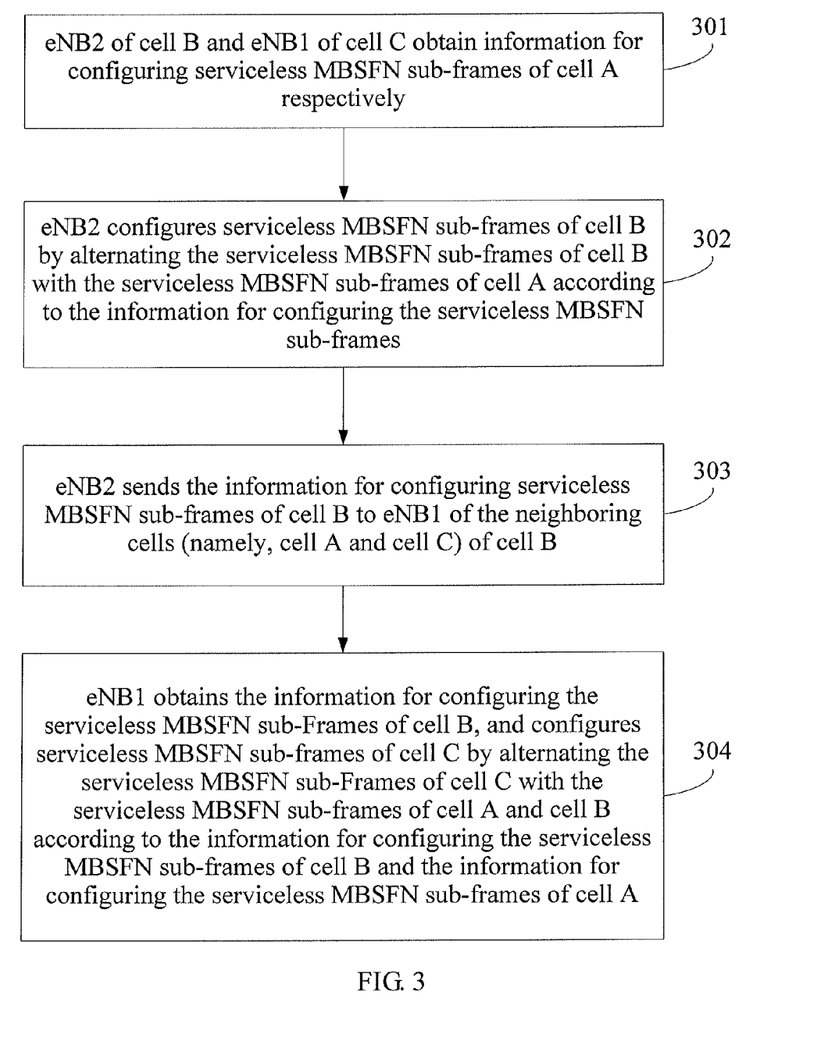
FIG. 3 is a flowchart of a method for configuring an energy-saving cell according to another embodiment of the present application.

As shown in FIG. 3, the method for configuring an energy-saving cell in this embodiment specifically includes the following steps:

301: eNB2 of cell B and eNB1 of cell C obtain information for configuring serviceless MBSFN sub-frames of cell A respectively.

Specifically, eNB2 of cell B may obtain information for configuring serviceless MBSFN sub-frames of cell A, where the information is sent by eNB1 through an X2 interface and may be "MBSFN sub-frame info", for example. In other words, eNB1 sends the information for configuring the serviceless MBSFN sub-frames of cell A to eNB2 in the neighboring cell "cell B" through the X2 interface, and notifies eNB2 that sub-frame 6, sub-frame 7, and sub-frame 8 in cell A are serviceless MBSFN sub-frames. Meanwhile, because cell A and cell C are under the same eNB, the process of eNB1 of cell C obtaining the information for configuring the serviceless MBSFN sub-frames of cell A may be regarded as being implemented inside eNB1. For example, eNB1 reads the locally stored information for configuring serviceless MBSFN sub-frames of cell A.

Optionally, after eNB1 configures serviceless MBSFN sub-frames of energy-saving cell A, as shown by dotted lines in FIG. 2, eNB2 may obtain information for configuring serviceless MBSFN sub-frames of cell A from eNB1 through the X2 interface, or an S1 interface, or an M2 interface, or an itf-N interface. Specifically, eNB1 may transmit the information for configuring the serviceless MBSFN sub-frames of cell A to eNB2 through the itf-N interface or the M2 interface, that is, through the itf-N interface, the information for configuring the serviceless MBSFN sub-frames of cell A, which is sent by eNB1, may be forwarded by an Operation Administration Maintenance (OAM) system to eNB2; and, through the M2 interface, the information for configuring the serviceless MBSFN sub-frames of cell A, which is sent by eNB1, may be forwarded by a Multi-cell/multicast Coordination Entity (MCE) to eNB2. Optionally, through the S1 interface, the information for configuring the serviceless MBSFN sub-frames of cell A, which is sent by eNB1, may be forwarded by a Mobility Management Entity (MME) to eNB2.

302: eNB2 configures serviceless MBSFN sub-frames of cell B by alternating the serviceless MBSFN sub-frames of cell B with the serviceless MBSFN sub-frames of cell A according to the information for configuring the serviceless MBSFN sub-frames.

Figure 4B:
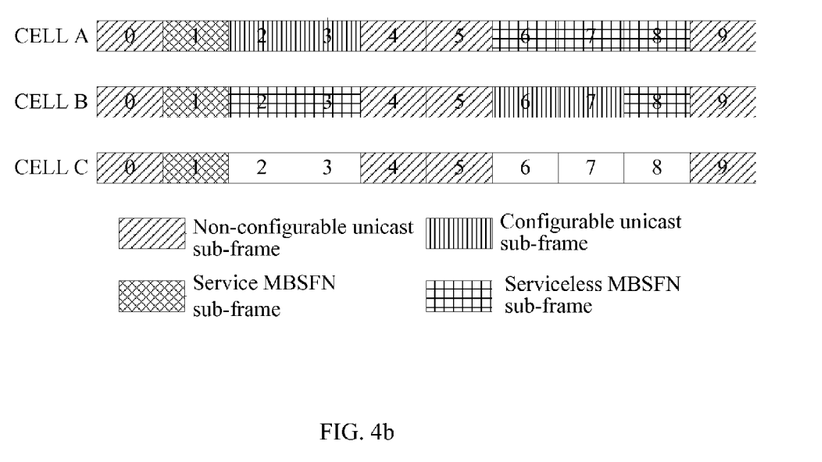

Specifically, as shown in FIG. 4*b*, eNB2 may configure sub-frame 2, sub-frame 3, and sub-frame 8 in cell B as serviceless MBSFN sub-frames, and configure sub-frame 6 and sub-frame 7 as configurable unicast sub-frames, according to the information for configuring the serviceless MBSFN sub-frames of cell A. In this case, the serviceless MBSFN sub-frames numbered 6, 7, and 8 in cell A partly alternate with the serviceless MBSFN sub-frames numbered 2, 3, and 8 in cell B (only sub-frame 8 overlaps).

303: eNB2 sends the information for configuring the serviceless MBSFN sub-frames of cell B to eNB1 of the neighboring cells (namely, cell A and cell C) of cell B.

304: eNB1 obtains the information for configuring the serviceless MBSFN sub-frames of cell B, and configures serviceless MBSFN sub-frames of cell C by alternating the serviceless MBSFN sub-frames of cell C with the serviceless MBSFN sub-frames of cell A and cell B according to the information for configuring the serviceless MBSFN sub-frames of cell B and the information for configuring the serviceless MBSFN sub-frames of cell A.

Figure 4C:
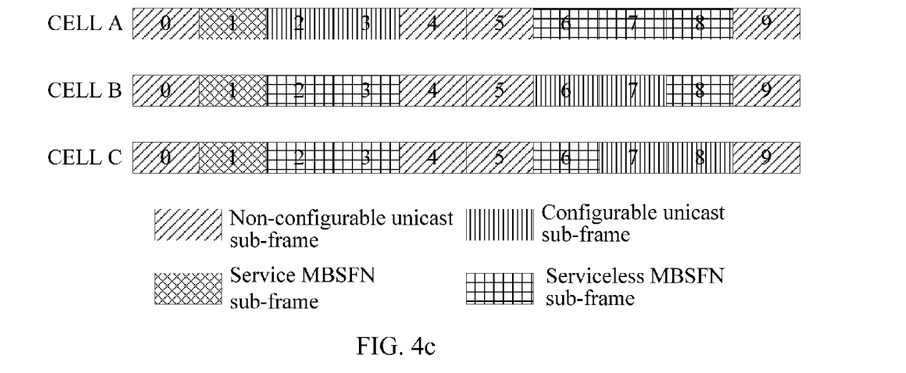

Specifically, as shown in FIG. 4c, eNB1 may configure sub-frame 2, sub-frame 3, and sub-frame 6 in cell C as serviceless MBSFN sub-frames, and configure sub-frame 7 and sub-frame 8 as configurable unicast sub-frames, according to the information for configuring the serviceless MBSFN sub-frames of cell A and cell B. In this case, the serviceless MBSFN sub-frames numbered 2, 3, and 6 in cell C partly alternate with the serviceless MBSFN sub-frames numbered 6, 7, and 8 in cell A, and the serviceless MBSFN sub-frames numbered 2, 3, and 8 in cell B.

Optionally, after step 301, step 3011 or step 3011' may also be included.

3011: When eNB1 of cell A detects that interference exceeds a preset threshold, eNB1 sends TOI information (for example, a TOI) to the eNB of the neighboring cell of cell A. After receiving the TOI information, eNB2 performs step 302.

3011': When cell A uses a high-interference sub-frame, eNB1 of cell A sends THII information (for example, THII) to the eNB of the neighboring cell of cell A. After receiving the THII information, eNB2 performs step 302.

Accordingly, after step 303, step 3031 and step 3031' may also be included.

3031: When eNB2 of cell B detects that the interference exceeds a preset threshold, eNB2 sends TOI information (for example, a TOI) to the eNB of the neighboring cell of cell B. After receiving the TOI information, eNB1 performs step 304.

3031': When cell B uses a high-interference sub-frame, eNB2 sends THII information (for example, THII) to the eNB of the neighboring cell. After receiving the THII information, eNB1 performs step 304.

Optionally, when the serviceless MBSFN sub-frames of the energy-saving cell change, the eNB of the energy-saving cell notifies the eNB of the neighboring cell of the change of configuration of the serviceless MBSFN sub-frames. The eNB of the neighboring cell of the energy-saving cell may configure the serviceless MBSFN sub-frames of the neighboring cell according to the change of the serviceless MBSFN sub-frames of the energy-saving cell. The change of the serviceless MBSFN sub-frames of the energy-saving cell includes: increasing or decreasing the serviceless MBSFN sub-frames of the energy-saving cell; and the decreasing of the serviceless MBSFN sub-frames of the energy-saving cell includes: sending, by the eNB of the energy-saving cell, the MBMS in the serviceless MBSFN sub-frames of the energy-saving cell, or configuring, by the eNB of the energy-saving cell, the serviceless MBSFN sub-frames of the energy-saving cell as unicast sub-frames or other service sub-frames. For example, when the serviceless MBSFN sub-frames in cell A decrease to zero, cell A quits an energy-saving state, and the serviceless MBSFN sub-frames of cell A are used for sending MBMS, or are configured as unicast sub-frames or other service sub-frames. In this case, eNB1 sends a notification message to eNB2 (and eNB1) of cell B and cell C to notify eNB2 (and eNB1) of the change of the serviceless MBSFN sub-frames of cell A. eNB1 and eNB2 may configure serviceless MBSFN sub-frames of cell C and cell B respectively according to the change of the serviceless MBSFN sub-frames of cell A.

In the method for configuring the energy-saving cell in this embodiment, the information for configuring the serviceless MBSFN sub-frames of the energy-saving cell is transmitted between eNBs, the configuration of the serviceless MBSFN sub-frames between neighboring cells is coordinated, and the serviceless MBSFN sub-frames of a cell alternate with the serviceless MBSFN sub-frames of the neighboring cells, thereby reducing interference between neighboring cells and improving stability of the system.

Figure 5:
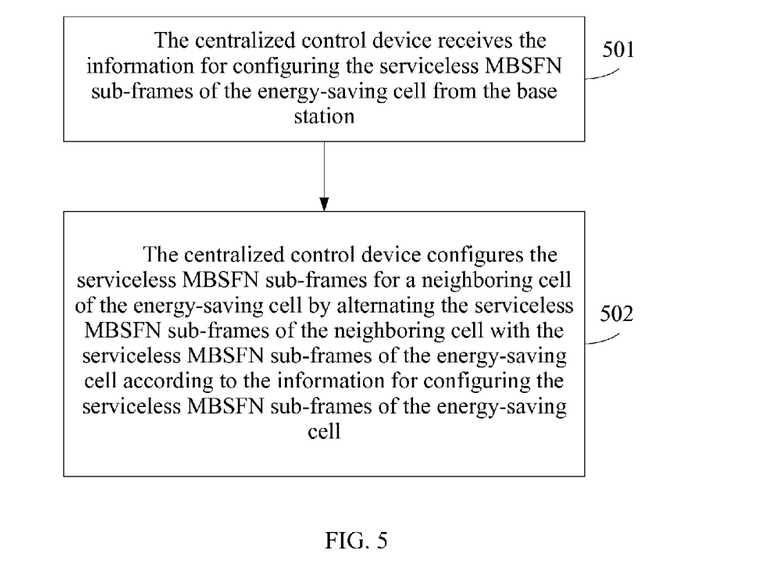
FIG. 5 is a flowchart of a method for configuring an energy-saving cell according to another embodiment of the present application.

If the network node is a centralized control device, as shown in FIG. 5, the method for configuring an energy-saving cell includes the following steps:

501: The centralized control device receives the information for configuring the serviceless MBSFN sub-frames of the energy-saving cell from a base station.

502: The centralized control device configures the serviceless MBSFN sub-frames for a neighboring cell of the energy-saving cell by alternating the serviceless MBSFN sub-frames of the neighboring cell with the serviceless MBSFN sub-frames of the energy-saving cell according to the information for configuring the serviceless MBSFN sub-frames of the energy-saving cell.

In practice, the centralized control device may be an OAM system, or an MCE, or another centralized control device capable of implementing step 501 and step 502.

Figure 6:
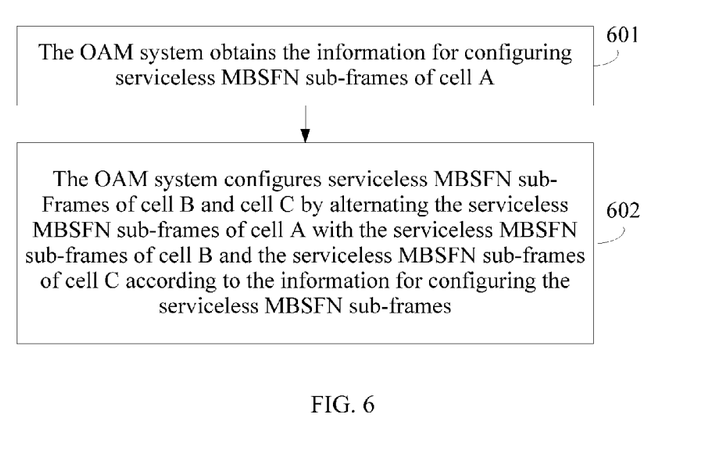
FIG. 6 is a flowchart of a method for configuring an energy-saving cell according to another embodiment of the present application.

The following describes the method for configuring the energy-saving cell in detail, supposing that cell A and cell C are under the same base station, for example, eNB1, and cell B is under eNB2, as shown in FIG. 2. In this embodiment, an OAM system is taken as an example of the centralized control device. In this embodiment, cell A, cell B, and cell C are adjacent to one another; and cell A is an energy-saving cell for which serviceless MBSFN sub-frames are configured. As shown in FIG. 4a, in cell A, cell B, and cell C, sub-frame 0, sub-frame 4, sub-frame 5, and sub-frame 9 are non-configurable unicast sub-frames, and sub-frame 1 is a sub-frameservice MBSFN sub-frame. eNB1 configures sub-frame 6, sub-frame 7, and sub-frame 8 of cell A as serviceless MBSFN sub-frames, and configures sub-frame 2 and sub-frame 3 as configurable unicast sub-frames. As shown in FIG. 6, the method for configuring an energy-saving cell in this embodiment includes the following steps.

601: The OAM system obtains the information for configuring the serviceless MBSFN sub-frames of cell A.

Specifically, eNB1 transmits the information (such as "MBSFN sub-frame info") for configuring the serviceless MBSFN sub-frames of cell A to the OAM system through an itf-N interface to notify the OAM system that sub-frame 6, sub-frame 7, and sub-frame 8 in cell A are serviceless MBSFN sub-frames.

602: The OAM system configures serviceless MBSFN sub-frames of cell B and cell C by alternating the serviceless MBSFN sub-frames of cell A with the serviceless MBSFN sub-frames of cell B and the serviceless MBSFN sub-frames of cell C according to the information for configuring the serviceless MBSFN sub-frames.

Specifically, as shown in FIG. 4c, the OAM system may configure sub-frame 2, sub-frame 3, and sub-frame 8 in cell B as serviceless MBSFN sub-frames, configure sub-frame 6 and sub-frame 7 in cell B as configurable unicast sub-frames, configure sub-frame 2, sub-frame 3, and sub-frame 6 in cell C as serviceless MBSFN sub-frames, and configure sub-frame 7 and sub-frame 8 in cell C as configurable unicast sub-frames according to the information for configuring the serviceless MBSFN sub-frames of cell A. In this case, the serviceless MBSFN sub-frames numbered 6, 7, and 8 in cell A alternate with the serviceless MBSFN sub-frames numbered 2, 3, and 8 in cell B, and the serviceless MBSFN sub-frames numbered 2, 3, and 6 in cell C.

Optionally, after step 601, step 6011 or step 6011' may also be included.

6011: When eNB1 of cell A detects that the interference exceeds a preset threshold, eNB1 sends TOI information (for example, a TOI) to the OAM system. After receiving the TOI information, the OAM system performs step 602.

6011': When cell A uses a high-interference sub-frame, eNB1 sends THII information (for example, THII) to the OAM system. After receiving the THII information, the OAM system performs step 602.

Optionally, when the serviceless MBSFN sub-frames of cell A change, the OAM system receives a notification message sent by eNB1, where the notification message is used for indicating the change of the serviceless MBSFN sub-frames of cell A. The OAM system may configure the serviceless MBSFN sub-frames of cell B and cell C according to the change of configuration of the serviceless MBSFN sub-frames of cell A. The change of the serviceless MBSFN sub-frames of cell A includes: increasing or decreasing the serviceless MBSFN sub-frames of cell A. More specifically, the decreasing of the serviceless MBSFN sub-frames of cell A includes: sending an MBMS in the serviceless MBSFN sub-frames of cell A, or configuring the serviceless MBSFN sub-frames of cell A as unicast sub-frames or other service sub-frames.

In another embodiment, the OAM system in the foregoing embodiment may be replaced with an MCE, and accordingly, the itf-N interface is replaced with an M2 interface. Persons of ordinary skill in the art understand that the OAM system in the foregoing embodiment may be replaced with another device capable of implementing centralized control.

In the method for configuring the energy-saving cell in this embodiment, the centralized control device configures the serviceless MBSFN sub-frames of the neighboring cells, and therefore, the serviceless MBSFN sub-frames of a cell alternate with the serviceless MBSFN sub-frames of the neighboring cells, thereby reducing interference between neighboring cells and improving stability of the system.

Figure 7:
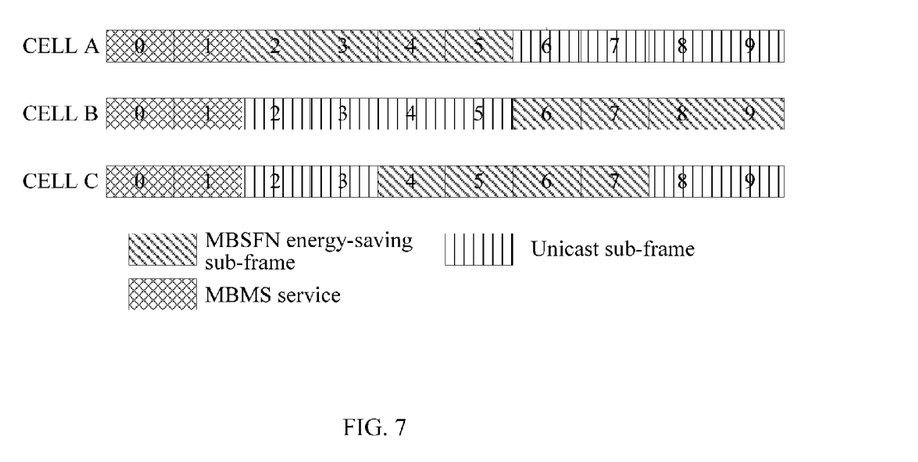
FIG. 7 is a schematic diagram of configuring sub-frames in a cell according to another embodiment of the present application.

In another embodiment, if the MBSFN sub-frames are not distinguished between the service MBSFN sub-frames and the serviceless MBSFN sub-frames, it is deemed that all MBSFN sub-frames are energy-saving MBSFN sub-frames. As shown in FIG. 7, it is assumed that cell A, cell B and cell C need to be configured, and sub-frame 0 and sub-frame 1 in cell A, cell B and cell C are MBMS sub-frames. If sub-frames 2-5 in cell A are configured as energy-saving MBSFN sub-frames and sub-frames 6-9 in cell A are configured as unicast sub-frames, it is appropriate to configure sub-frames 6-9 in cell B as energy-saving MBSFN sub-frames, configure sub-frames 2-5 in cell B as unicast sub-frames, configure sub-frames 4-7 in cell C as energy-saving MBSFN sub-frames, and configure sub-frame 2, sub-frame 3, sub-frame 8, and sub-frame 9 in cell C as unicast sub-frames. For detailed configuration method, reference may be made to the previous embodiment, and details will not be described herein again.

Figure 8:
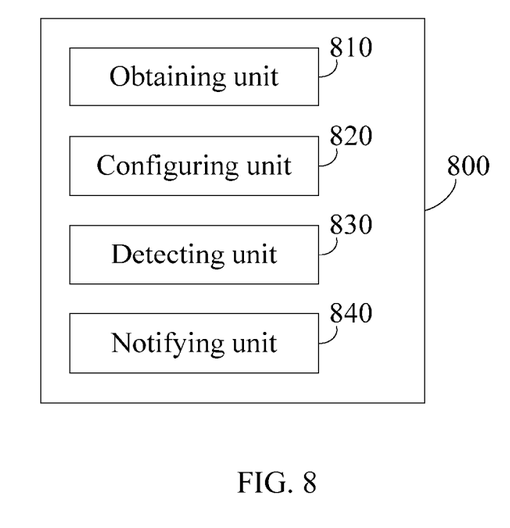
FIG. 8 is a schematic structure diagram of a base station according to an embodiment of the present application.

As shown in FIG. 8, a base station 800 provided in an embodiment of the present application includes an obtaining unit 810 and a configuring unit 820.

The obtaining unit 810 is configured to obtain information for configuring serviceless MBSFN sub-frames of an energy-saving cell; and the configuring unit 820 configures serviceless MBSFN sub-frames of a neighboring cell of the energy-saving cell by alternating the serviceless MBSFN sub-frames of the neighboring cell with the serviceless MBSFN sub-frames of the energy-saving cell according to the information for configuring the serviceless MBSFN sub-frames of the energy-saving cell.

Optionally, the obtaining unit 810 may receive the information for configuring the serviceless MBSFN sub-frames of the energy-saving cell through an X2 interface, or an S1 interface, or an M2 interface, or an itf-N interface.

Optionally, the configuring unit 820 is further adapted to configure the serviceless MBSFN sub-frames of the neighboring cell of the energy-saving cell according to the received information for configuring the serviceless MBSFN sub-frames of the energy-saving cell after receiving TOT information and/or THII information sent by the base station of the energy-saving cell.

Optionally, when the base station 800 serves as a base station of the energy-saving cell, the base station may further include a detecting unit 830, which is configured to: send TOT information to the base station of the neighboring cell of the energy-saving cell when detecting that interference of the energy-saving cell exceeds a preset threshold, or send THII information to the base station of the neighboring cell of the energy-saving cell when detecting that the energy-saving cell uses a high-interference sub-frame.

Optionally, when the base station 800 serves as a base station of the energy-saving cell, the base station may further include a notifying unit 840, which is configured to send a notification message to the base station of the neighboring cell of the energy-saving cell when the serviceless MBSFN sub-frames of the energy-saving cell change, where the notification message is used for indicating the change of the serviceless MBSFN sub-frames of the energy-saving cell. The change of the serviceless MBSFN sub-frames of the energy-saving cell includes: increasing or decreasing the serviceless MBSFN sub-frames of the energy-saving cell; and the decreasing of the serviceless MBSFN sub-frames of the energy-saving cell includes: sending an MBMS in the serviceless MBSFN sub-frames of the energy-saving cell, or configuring the serviceless MBSFN sub-frames of the energy-saving cell as unicast sub-frames or other service sub-frames. When the serviceless MBSFN sub-frames in the energy-saving cell decrease to zero, the energy-saving cell quits an energy-saving state.

Optionally, when the base station 800 serves as a base station of the neighboring cell, the base station may further include a receiving unit, which is configured to receive the notification message sent by the energy-saving cell. In this case, the configuring unit 820 may be further adapted to configure the serviceless MBSFN sub-frames of the neighboring cell according to the change of the serviceless MBSFN sub-frames indicated in the notification message.

The base station 800 provided in this embodiment can implement the method embodiment shown in FIG. 3. In the technical solution provided in this embodiment, the information for configuring the serviceless MBSFN sub-frames of the energy-saving cell is transmitted between base stations, the configuration of the serviceless MBSFN sub-frames between neighboring cells is coordinated, and the serviceless MBSFN sub-frames of a cell alternate with the serviceless MBSFN sub-frames of the neighboring cells, thereby reducing interference between neighboring cells and improving stability of the system.

Figure 9:
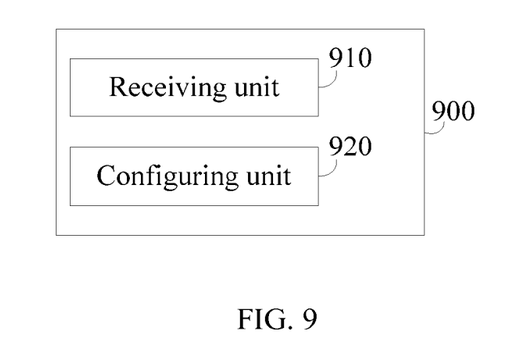
FIG. 9 is a schematic structure diagram of a centralized control device according to an embodiment of the present application.

As shown in FIG. 9, a centralized control device 900 provided in an embodiment of the present application includes a receiving unit 910 and a configuring unit 920.

The receiving unit 910 is configured to receive information for configuring serviceless MBSFN sub-frames of an energy-saving cell from a base station. The configuring unit 920 is adapted to configure serviceless MBSFN sub-frames for a neighboring cell of the energy-saving cell by alternating the serviceless MBSFN sub-frames of the neighboring cell with the serviceless MBSFN sub-frames of the energy-saving cell according to the information for configuring the serviceless MBSFN sub-frames of the energy-saving cell received by the receiving unit 910.

Optionally, the centralized control device may be an OAM system, or an MCE, or another device capable of implementing centralized control. Persons skilled in the art understand that in some scenarios, the base station may also serve as a centralized control device to configure serviceless MBSFN sub-frames for the cells under other base station s.

Optionally, after receiving TOI information and/or THII information sent by the base station, the configuring unit 920 configures the serviceless MBSFN sub-frames of the neighboring cell of the energy-saving cell according to the information for configuring the serviceless MBSFN sub-frames of the energy-saving cell.

Optionally, the receiving unit 910 is further configured to receive a notification message sent by the base station of the energy-saving cell, where the notification message is used for indicating change of the serviceless MBSFN sub-frames of the energy-saving cell. The change of the serviceless MBSFN sub-frames of the energy-saving cell includes: increasing or decreasing the serviceless MBSFN sub-frames of the energy-saving cell; and the decreasing of the serviceless MBSFN sub-frames of the energy-saving cell includes: sending an MBMS in the serviceless MBSFN sub-frames of the energy-saving cell, or configuring the serviceless MBSFN sub-frames of the energy-saving cell as unicast sub-frames or other service sub-frames. When the serviceless MBSFN sub-frames in the energy-saving cell decrease to zero, the energy-saving cell quits an energy-saving state.

Optionally, after the receiving unit 910 receives the notification message, the configuring unit 920 may further configure the serviceless MBSFN sub-frames of the neighboring cell according to the change of the serviceless MBSFN sub-frames indicated in the notification message.

In the technical solution provided in this embodiment, the centralized control device coordinates configuration of the serviceless MBSFN sub-frames between neighboring cells, and therefore, the serviceless MBSFN sub-frames of a cell alternate with the serviceless MBSFN sub-frames of the neighboring cells, thereby reducing interference between neighboring cells and improving stability of the system.

Figure 10:
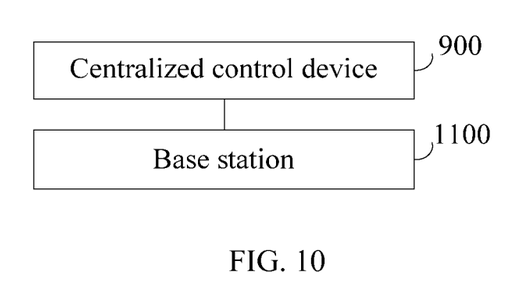
FIG. 10 is a schematic diagram of a system for configuring an energy-saving cell according to an embodiment of the present application.

As shown in FIG. 10, an embodiment of the present application provides a system for configuring an energy-saving cell. The system includes the centralized control device 900 shown in FIG. 9 and a base station 1100 of an energy-saving cell. For the structure and functions of the centralized control device 900, reference may be made to the embodiments described in the foregoing, and details will not be described herein again.

The base station 1100 of the energy-saving cell sends information for configuring serviceless MBSFN sub-frames of the energy-saving cell to the centralized control device 900.

Optionally, the base station 1100 of the energy-saving cell is further configured to send TOI information to the centralized control device 900 after detecting that interference of the energy-saving cell exceeds a preset threshold, or sends THII information to the centralized control device 900 after detecting that the energy-saving cell uses a high-interference sub-frame.

Optionally, the base station 1100 of the energy-saving cell is further configured to send a notification message to the centralized control device 900 when the serviceless MBSFN sub-frames of the energy-saving cell change, where the notification message is used for indicating the change of the serviceless MBSFN sub-frames of the energy-saving cell.

The change of the serviceless MBSFN sub-frames of the energy-saving cell includes: increasing or decreasing the serviceless MBSFN sub-frames of the energy-saving cell; and the decreasing of the serviceless MBSFN sub-frames of the energy-saving cell includes: sending an MBMS in the serviceless MBSFN sub-frames of the energy-saving cell, or configuring the serviceless MBSFN sub-frames of the energy-saving cell as unicast sub-frames or other service sub-frames. When the serviceless MBSFN sub-frames in the energy-saving cell decrease to zero, the energy-saving cell quits an energy-saving state.

In the system for configuring an energy-saving cell in this embodiment, the centralized control device coordinates configuration of the serviceless MBSFN sub-frames between neighboring cells, and therefore, the serviceless MBSFN sub-frames of a cell alternate with the serviceless MBSFN sub-frames of the neighboring cells, thereby reducing interference between neighboring cells and improving stability of the system.

Persons of ordinary skill in the art should understand that all or part of the steps of the method of the present application may be implemented by a computer program instructing relevant hardware. The program may be stored in a computer readable storage medium. When the program is run, the program executes the method specified in any embodiment of the present application. The storage medium may be a magnetic disk, an optical disk, Read-Only Memory (ROM), or Random Access Memory (RAM).

Disclosed in the foregoing are the objectives, technical solution and benefits of the embodiments of the present application. It should be understood that, the above descriptions are merely exemplary embodiments of the present application, but are not intended to limit the protection scope of the present application. Any modification, equivalent replacement, or improvement made by persons skilled in the art without creative efforts should fall within the protection scope of the present application.

What is claimed is:

1. A method for configuring serviceless Multicast Broadcast Single Frequency Network (MBSFN) sub-frames in a radio frame, comprising:
   obtaining, by a base station of a neighboring cell of a first cell, configuration information of a first frame of the first cell, wherein the configuration information of the first frame comprises position information of a first set of one or more serviceless MBSFN sub-frames in the first frame; and
   configuring, by the base station of the neighboring cell, a second set of one or more serviceless MBSFN sub-frames in a second frame according to the configuration information of the first set of one or more serviceless MBSFN sub-frames in the first frame, wherein at least one serviceless MBSFN sub-frame of the second set of one or more serviceless MBSFN sub-frames in the second frame is not at the same position of any of the first set of one or more serviceless MBSFN sub-frames in the first frame;
   wherein a serviceless MBSFN sub-frame is an idle sub-frame, and radio frames of both the first cell and the neighboring cell are configured with at least one MBSFN sub-frame.

2. The method according to claim 1, further comprising:
   receiving, by the base station, at least one of Time division interference Overload Indicator (TOI) information and Time division High Interference Indication (THII) information sent by a base station of the first cell.

3. The method according to claim 2, wherein the TOI information is sent by the base station of the first cell when an interference in the first cell exceeds a threshold.

4. The method according to claim 2, wherein the THII information is sent by the base station of the first cell when a high-interference sub-frame exists in one or more sub-frames of the first cell.

5. The method according to claim 1, further comprising:
receiving, by the base station of the neighboring cell, a notification message from a base station of the first cell, wherein the notification message is sent when the first set of one or more serviceless MBSFN sub-frames changes, and the notification message is used for indicating the change of the first set of one or more serviceless MBSFN sub-frames.

6. The method according to claim 5, wherein the change of the first set of one or more serviceless MBSFN sub-frames includes increasing or decreasing of the number of the first set of one or more serviceless MBSFN sub-frames.

7. The method according to claim 6, wherein decreasing of the number of the first set of one or more serviceless MBSFN sub-frames is caused by:
a Multicast Broadcast Media Service (MBMS) being carried in a serviceless MBSFN sub-frame of the first set of one or more serviceless MBSFN sub-frames, or
a serviceless MBSFN sub-frame in the first set of one or more serviceless MBSFN sub-frames being configured as a unicast sub-frame or other service sub-frame.

8. The method according to claim 1, wherein the step of obtaining the configuration information of the first frame comprises:
receiving, by the base station of the neighboring cell, the configuration information of the first set of one or more serviceless MBSFN sub-frames in the first frame from a base station of the first cell.

9. A base station, wherein a neighboring cell of a first cell belongs to the base station, and the base station comprises:
a receiver, configured to receive configuration information of a first frame of the first cell, wherein the configuration of the first frame comprises position information of a first set of one or more serviceless Multicast Broadcast Single Frequency Network (MBSFN) sub-frames in the first frame;
a processor, configured to set a second set of one or more serviceless MBSFN sub-frames in a second frame according to the configuration information of the first set of one or more serviceless MBSFN sub-frames in the first frame, wherein at least one serviceless MBSFN sub-frame of the second set of one or more serviceless MBSFN sub-frames in the second frame is not at the same position of any position of the first set of one or more serviceless MBSFN sub-frames in the first frame; and
a transmitter, configured to transmit the second frame configured with the second set of one or more serviceless MBSFN sub-frames;
wherein a serviceless MBSFN sub-frame is an idle sub-frame, and radio frames of both the first cell and neighboring cell are configured with at least one MBSFN sub-frame.

10. The base station according to claim 9, wherein the configuration information of the first set of one or more serviceless Multicast Broadcast Single Frequency Network (MBSFN) sub-frames is received from a base station of the first cell.

11. The base station according to claim 9, wherein
the receiver is further configured to receive at least one of Time division interference Overload Indicator (TOI) information and Time division High Interference Indication (THII) information sent by a base station of the first cell.

12. The base station according to claim 11, wherein the TOI information is sent by the base station of the first cell when an interference of the first cell exceeds a preset threshold.

13. The base station according to claim 11, wherein the THII information is sent by the base station of the first cell when a high-interference sub-frame exists in one or more sub-frames of the first cell.

14. The base station according to claim 9, wherein the receiver is further configured to receive a notification message from the base station of the first cell when the first set of one or more serviceless MBSFN sub-frames changes, and the notification message is used for indicating the change of the first set of one or more serviceless MBSFN sub-frames.

15. A centralized control device, comprising:
a receiver, configured to receive configuration information of a first frame of a first cell, wherein the configuration information of the first frame comprises position information of a first set of one or more serviceless Multicast Broadcast Single Frequency Network (MBSFN) sub-frames in the first frame; and
a processor, configured to configure a second set of one or more serviceless MBSFN sub-frames in a second frame of a neighboring cell of the first cell according to the configuration information of the first set of one or more serviceless MBSFN sub-frames in the first frame, wherein at least one serviceless MBSFN sub-frame of the second set of one or more serviceless MBSFN sub-frames in the second frame is not at the same position of any of the first set of one or more serviceless MBSFN sub-frames in the first frame;
wherein a serviceless MBSFN sub-frame is an idle sub-frame, and radio frames of both the first cell and the neighboring cell are configured with at least one MBSFN sub-frame.

16. The centralized control device according to claim 15, wherein the receiver is further configured to:
receive a notification message from a base station of the first cell, wherein the notification message is sent when the first set of one or more serviceless MBSFN sub-frames changes, and the notification message is used for indicating the change of the first set of one or more serviceless MBSFN sub-frames in the first frame.

* * * * *